United States Patent [19]

Massa

[11] 4,210,969

[45] Jul. 1, 1980

[54] SONIC RANGING SYSTEMS TO ELIMINATE ERRORS DUE TO VARIATIONS IN THE SOUND VELOCITY IN THE MEDIUM

[75] Inventor: Frank Massa, Randolph, Mass.

[73] Assignee: The Stoneleigh Trust, Cohasset, Mass. ; Fred M. Dellorfano, Jr. and Donald P. Massa, Trustees

[21] Appl. No.: 885,813

[22] Filed: Mar. 13, 1978

[51] Int. Cl.² .................................................. G01S 9/68
[52] U.S. Cl. .................................. 367/108; 73/290 V; 367/902; 367/908
[58] Field of Search ...................... 340/1 L, 1 C, 8 FT; 73/290 V; 367/108, 902, 908

[56] References Cited

U.S. PATENT DOCUMENTS

| 2,753,542 | 7/1956 | Rod et al. | 367/97 |
|---|---|---|---|
| 3,123,797 | 3/1964 | Ehrman | 367/108 |
| 3,184,969 | 5/1965 | Bolton | 367/908 X |
| 3,290,490 | 12/1966 | Auer, Jr. | 367/89 |
| 3,394,589 | 7/1968 | Tomioka | 367/108 X |
| 3,745,829 | 7/1973 | Franchi | 367/108 X |
| 3,834,233 | 9/1974 | Willis et al. | 367/108 X |
| 4,145,914 | 3/1979 | Newman | 367/99 X |

Primary Examiner—Richard A. Farley

[57] ABSTRACT

An improved sound ranging system increases the precision of range measurement by automatically correcting for any variation in the velocity of sound in the medium. The automatic correction for the sound velocity utilizes a small sound reflecting target located at a precise fixed distance from the transducer surface. A digital circuit, including a microcomputer, improves the measurement accuracy of the system. The invention includes a time delay and sensitivity control in one of the two time measurement circuits employed in the system to prevent "ghost" signals caused by multiple round-trip target reflections from introducing errors in the range measurements.

6 Claims, 5 Drawing Figures

SONIC RANGING SYSTEMS TO ELIMINATE ERRORS DUE TO VARIATIONS IN THE SOUND VELOCITY IN THE MEDIUM

This invention is concerned with improved means for sonic ranging and, more particularly, with means for improving the precision of measuring the distance from a reference point at the transducer to the reflecting surface of the target. The general principle of operation of a sonic ranging system depends on the measurement of the time required for a pulse of sound to travel the round trip distance from the transducer to the reflecting surface. The basic technique for making such measurements is well known and is commonly used in depth sounders, submarine detection sonar systems, etc.

A basic limitation in all sonic ranging systems is that the precision of measurement of range is dependent on the actual value of the velocity of sound in the medium at the time the measurements are made. Therefore, when high accuracy is required in the range measurement, the velocity of sound must be accurately known at the time of making the measurement. For specialized applications, such as the measurement of the contents of liquid storage tanks or grain storage bins, by measuring the height of the air space above the surface of the stored material, the velocity of sound in the air space may vary sufficiently because of the presence of chemical vapors or by changes in temperature, to require sound velocity corrections to be made where high accuracy in the measurement is required. This is especially true when the storage levels are low in the tanks and the air space is a large proportion of the tank height.

The primary object of this invention is to improve the design of sound ranging systems for increasing the precision of measurement of the distance between a reference point at the transducer and the position of a sound reflecting surface.

Another object of this invention is to provide a self-calibrating means in a sound ranging system that automatically corrects for any variation in the velocity of sound in the medium within which the sound ranging measurement is being made.

A still further object of this invention is to provide a small sound reflecting target located at a precise fixed distance from the sound radiating face of the electroacoustic transducer for the purpose of returning a small first echo upon the arrival of the sound burst pulse transmitted from the transducer and, further, to use the arrival time of the echo to automatically calibrate the sound ranging system and continuously correct the data to compensate for any variation in the velocity of sound which occurs in the medium.

Another object of this invention is to improve the design of a sound ranging system by using digital circuit and microprocessor techniques to achieve improved system accuracy as well as immunity from errors because of variation in the velocity of sound that may be occuring in the medium.

The novel features which are characteristic of this invention are set forth with particularity in the appended claims. The invention itself, however, both as to its organization and method of operation as well as additional objects and advantages thereof will best be understood by reference to the following description taken in conjunction with the accompanying drawings in which:

Figure 1:
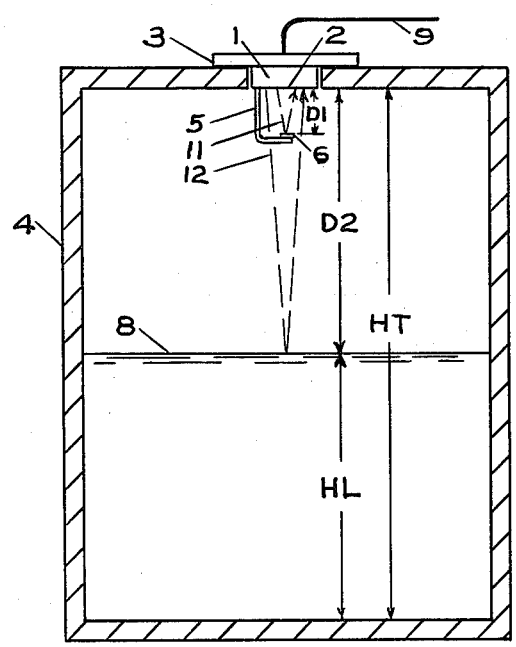
FIG. 1 is a schematic illustration of the inventive sound ranging system being used for the monitoring of the liquid height in a liquid storage tank.

Referring more particularly to the figures, the reference character 1 represents an electroacoustic transducer provided with a mounting flange 3 which is used for attaching the transducer to the opening at the top of storage tank 4. The attachment of the transducer may be accomplished by means of bolts or clamps in the conventional manner, and a gasket or O-ring seal may be provided between the transducer flange and the mating tank surface, as is well known in the art. The transducer is preferably of the directional type so that the sound is radiated in a narrow beam. The transducer is mounted as shown in FIG. 1 so that the sound is transmitted along the vertical axis of the tank. Structural details of the transducer are not shown because they are well known in the prior art.

Figure 2:
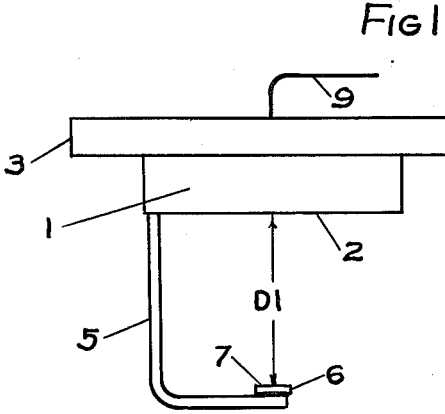
FIG. 2 is an enlarged side view of the transducer illustrated in FIG. 1.
Figure 3:
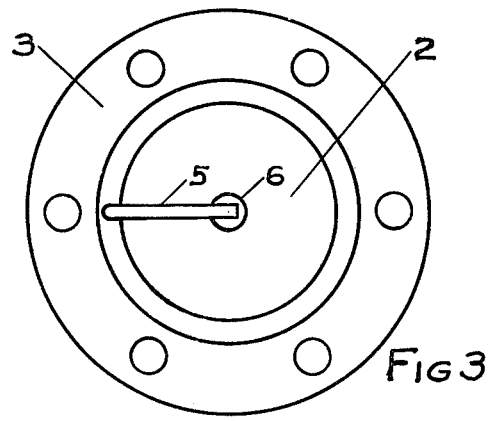
FIG. 3 is a plan view of the transducer.

The transducer is provided with an extension L-shaped rod member 5 which is rigidly attached to the transducer housing structure by welding, or by any other suitable means. A small disc 6, which acts as a sound reflecting target, is rigidly attached to the rod member 5, as illustrated, so that the flat reflecting surface 7 of the target is located perpendicular to the axis of the transducer. The position of the target reflecting surface 7 is fixed at a precise distance D1 from the transducer vibratile surface 2, as shown in FIG. 2. The function of the reflecting target 6 is to provide a self-calibrating means for automatically correcting for errors in the measurement of distance from the transducer to the surface of the liquid 8, which would otherwise occur as a result of variations of the velocity of sound in the air space above the liquid, as will be described later.

When the transducer is mounted at the top of the tank 4, as illustrated in FIG. 1, the sound radiating face 2 of the transducer is preferably located in the same plane as the inside top surface of the tank from which the liquid level surface 8 of the tank contents is to be measured. The operation of the sound ranging measurement system is as follows: A short pulse of sound is generated by the transducer by momentarily connecting an electrical signal from the pulse generator 13 to the transducer terminal 9. The momentary electrical connection is established by the T-R switch 10 when it switched up to the position T. At the same instant that the output from the pulse generator 13 is connected to the transducer terminal 9, the electrical signal is also momentarily connected to simultaneously start both counters C1 and C2, as illustrated in the schematic block diagram in FIG. 4. The directional sound beam generated by the transducer 1 travels along the paths 11 and 12 illustrated in FIG. 1. The sound travelling along the path 11 is reflected from the target 6 and is returned to the transducer while, at the same time, the sound travelling along the path 12 is reflected from the liquid surface 8 and is returned to the transducer at a later time, as illustrated.

After the switch 10 makes momentary contact with the terminals in the upper switch position T, it is immediately returned to the position R which connects the transducer terminal 9 to the input of amplifier 14, thus placing the system in RECEIVE condition awaiting the return of the reflected signals from the target 6 and the liquid surface 8. At the instant of receiving the reflected signal from the target 6, the counter C1 is stopped, and at the instant of receiving the reflected signal from the liquid surface 8, the counter C2 is stopped, as illustrated in the schematic block diagram in FIG. 4. A time delay 21 is introduced between the amplifier 14 and counter C2 to prevent the reflection from the target 6 from stopping counter C2. The time period T1 measured by counter C1 is illustrated in FIG. 5 by the number of cycles N1 of the crystal clock oscillator 15 between the START time T0 and the STOP time T1 which represents the round-trip distance from the transducer surface 2 to the target 6. Therefore N1 is proportional to the target distance D1. Similarly, the time period T2 measured by the counter C2 is represented by the number of cycles N2 of the crystal clock between the START time T0 and the STOP time T2 which represents the round-trip distance from the transducer surface 2 to the liquid surface 8. Therefore N2 is proportional to the distance from the transducer to the liquid surface D2.

Figure 4:
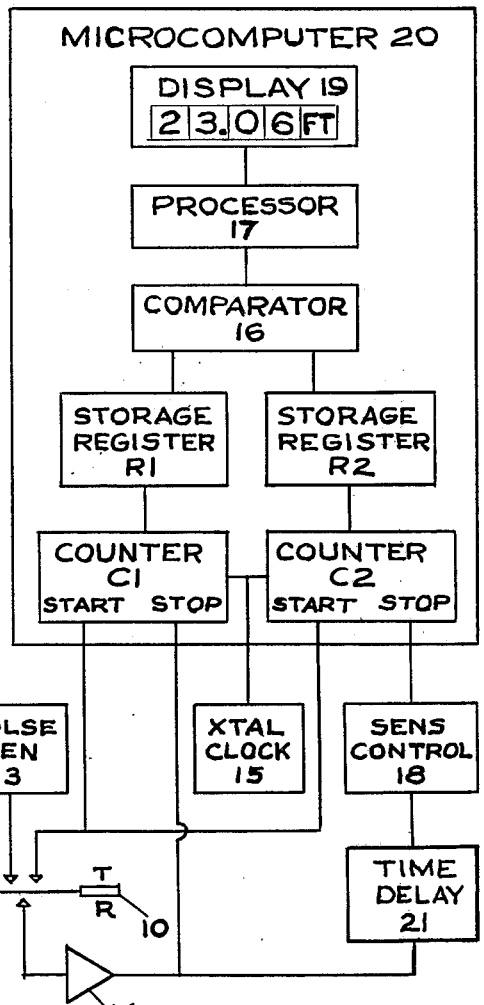
FIG. 4 is a block diagram of a digital electronic circuit adapted for use with the improved sound ranging system.
Figure 5:
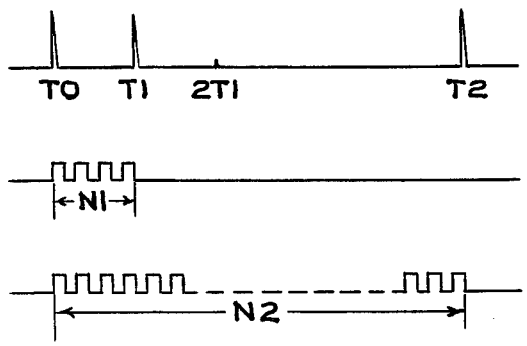
FIG. 5 is a schematic representation of the time interval measurements made by the electronic circuit to result in liquid level measurements independent of the change in velocity of sound in the medium.

The counts measured by the counters C1 and C2 are stored in the storage registers R1 and R2, as indicated in FIG. 4. The outputs from the storage registers are fed into the comparator 16 which determines the ratio N2/N1, which is then transmitted to the processor 17 to perform the computation:

$$N_2/N_1 \times D1 = D2$$

and $$HT - D2 = HL$$

where HL is the height of the liquid in the storage tank shown in FIG. 1. The magnitude HL is shown on the LED display 19 illustrated in FIG. 4. All of the various data processing functions and computations described in FIG. 4 may be performed by well known digital circuits by a digital or microcomputer engineer. The specific circuit details are not part of this invention; therefore they are not shown in the drawings where only schematic circuits are used to illustrate the fundamental principles of the invention. The data processing functions illustrated schematically within the large rectangular border in FIG. 4 can be combined in a microcomputer chip 20, and a software program can be developed by any microcomputer engineer to perform the inventive functions described to achieve the objects of this invention.

FIG. 5 illustrates the START pulse T0 which is simultaneously transmitted to the counters C1 and C2 at the instant of moving the TR switch 10 to the transmit position T. FIG. 5 also shows the STOP pulse T1 which is transmitted from the amplifier 14 to the counter C1 at the instant of arrival of the target reflection signal 11 at transducer surface 2. An additional "ghost" target signal 2T1 may appear as a result of a second bounce round-trip signal from the target. Such a "ghost" signal from the target, if present, could result in an erroneous measurement of HL by stopping the counter C2 prematurely before the arrival of the reflected acoustic signal T2 from the liquid surface 8. To eliminate the "ghost" signal 2T1, a sensitivity control 18 is placed between the amplifier 14 and the counter C2, as shown in FIG. 4, and the sensitivity is adjusted until the level of the ghost signal 2T1 is below the threshold level of the counter C2. After making this adjustment, the counter C2 will run until the arrival of the reflected signal T2 from the surface of the liquid, at which time the correct count N2 will be measured by the counter C2. The time delay 21 is adjusted to prevent the actuation of the counter C2 by the target signal T1.

The use of the acoustic target for automatically calibrating the system for any variation in the velocity of sound has been described in connection with making measurements of the air space distance D2, as illustrated in FIG. 1. Such a measurement procedure is required when solid material is stored in the container 14. When a liquid is stored, the liquid level may be determined either from the measurement of the air space distance D2, as described, or, alternately, the direct measurement of the liquid height HL could be measured by immersing the transducer at the bottom of the tank with the target 6 facing upward toward the liquid surface in the tank. Obviously, for the latter measurement procedure, the transducer would have to be designed for use in a liquid. Such designs are well known to a transducer engineer skilled in the design of sonar transducers and are not part of this invention.

While a specific embodiment of the present invention has been shown and described, it should be understood that various modifications and alternative constructions may be made without departing from the true spirit and scope of the invention. Therefore, the appended claims are intended to cover all such equivalent alternative constructions that fall within their true spirit and scope.

I claim:

1. In combination in an electroacoustic sound range measurement system, transmitting electroacoustic transducer means, electric signal means for driving said transmitting transducer, switching means for momentarily connecting said electric signal means to said transducer, whereby a short burst of sound is generated by said transducer, a small sound reflecting target mounted along the axis of propagation of said sound burst of sound and precisely spaced from the sound radiating surface of said transmitting transducer by a fixed specified distance D1, electronic time measurement circuit means, switching means for starting said electronic time measurement means at the same instant of connecting the electric signal means to said transmitting transducer, receiving electroacoustic transducer means for receiving said transmitted sound burst signal after it is reflected from said target, said receiving transducer means also adapted for receiving said sound burst signal after it is returned from a sound reflecting surface located at an unknown distance D2 from said transducer radiating surface, first electronic circuit means connected to said receiving transducer and adapted for first stopping said electronic time measurement means at the first instant of the sound reflection from said reflecting target, whereby a first time period T1 is indicated by said time measurement means, second electronic circuit means connected to said receiving transducer and adapted for stopping said time measurement means a second time at the instant of arrival of the sound reflection from said sound reflecting surface located at the unknown D2, whereby a second time period T2 is indicated by said time measurement means, and signal processing means whereby the ratio of T2/T1 is determined, said ratio T2/T1 being representative of the true distance D2 independent of the velocity of sound in the vicinity of said transmitting electroacoustic transducer, said electronic time measurement circuit means includes a sensitivity control means in said second electronic circuit means for adjusting the threshold sensitivity of said second electronic circuit whereby said time measurement circuit means is not responsive to any signal that may be generated by the receiving transducer as a result of multiple reflection between the receiving transducer and said target.

2. The invention in claim 1 characterized in that a time delay is included in said electronic time measurement circuit, whereby the activation of said second electronic circuit means is delayed by a period greater than the time required for the reflected target signal to arrive at said first electronic circuit means, whereby the reflected tone burst signal from said target is not recognized by said second electronic circuit which is adapted for stopping said time measurement means at the instant of arrival of the sound reflection from said sound reflecting surface located at the unknown distance D2.

3. The invention in claim 1 characterized in that said reflecting target is a rigid integral part of the transmitting transducer assembly.

4. The invention in claim 1 characterized in that said electronic time measurement circuit means includes digital circuit elements.

5. The invention in claim 4 further characterized in that said time measurement circuit includes a microcomputer.

6. In combination in an electroacoustic sound ranging system for use in measuring the level of material contained in a storage tank, a directional electroacoustic transducer, mounting means for attaching said transducer to said tank, said mounting means characterized in that the transducer beam axis is maintained parallel to the vertical axis of said tank, electric signal means for driving said transducer, switching means for momentarily connecting said electric signal means to said transducer, whereby a short burst of sound is generated by said transducer, a small sound reflecting target mounted along the axis of propagation of said burst of sound and precisely spaced from the sound radiating surface of said transmitting transducer by a fixed specified distance D1, electronic time measurement circuit means, switching means for starting said electronic time measurement means at the same instant of connecting the electric signal means to said transducer, receiving electroacoustic transducer means for receiving said transmitted sound burst signal after it is reflected from said target, said receiving transducer means also adapted for receiving said sound burst signal after it is reflected from the surface of said material contained in said storage tank, said surface of said material being located at an unknown distance D2 from said transducer, first electronic circuit means connected to said receiving transducer and adapted for first stopping said electronic time measurement means at the first instant of arrival of the sound reflection from said reflecting target, whereby a first time period T1 is indicated by said time measurement means, second electronic circuit means connected to said receiving transducer and adapted for stopping said time measurement means a second time at the instant of arrival of the sound reflection from said material surface located at the unknown distance D2, whereby a second time period T2 is indicated by said time measurement means, and signal processing means whereby the ratio of T2/T1 is determined, said ratio T2/T1 being representative of the true distance D2 independent of the velocity of sound in the vicinity of said transmitting electroacoustic transducer, said electronic time measurement circuit means includes a sensitivity control means in said second electronic circuit means for adjusting the threshold sensitivity of said second electronic circuit whereby said time measurement circuit means is not responsive to any signal that may be generated by the receiving transducer as a result of multiple reflection between the receiving transducer and said target.

* * * * *

UNITED STATES PATENT AND TRADEMARK OFFICE
CERTIFICATE OF CORRECTION

PATENT NO. : 4,210,969
DATED : July 1, 1980
INVENTOR(S) : Frank Massa

It is certified that error appears in the above—identified patent and that said Letters Patent is hereby corrected as shown below:

On the cover page, item (75) Inventor's address should read -- Cohasset, Mass. --.

Signed and Sealed this

Third Day of February 1981

[SEAL]

Attest:

RENE D. TEGTMEYER

Attesting Officer

Acting Commissioner of Patents and Trademarks